United States Patent
Zhong

(10) Patent No.: US 6,526,029 B1
(45) Date of Patent: Feb. 25, 2003

(54) SEARCH SCHEME FOR RECEIVERS IN MOBILE COMMUNICATION SYSTEMS

(75) Inventor: Lizhi Zhong, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/066,510

(22) Filed: Apr. 24, 1998

(51) Int. Cl.[7] .............................................. H04B 7/216
(52) U.S. Cl. ...................... 370/335; 370/328; 370/342; 370/441; 370/465; 370/479; 375/147; 455/63; 455/65; 455/504
(58) Field of Search .................................. 375/140, 147, 375/149, 150, 359; 370/328, 342, 441, 465, 468, 479, 335; 455/63, 65, 422, 504, 515

(56) References Cited

U.S. PATENT DOCUMENTS

| | | | |
|---|---|---|---|
| 4,459,701 A | | 7/1984 | Lamiral et al. |
| 5,177,765 A | * | 1/1993 | Holland et al. ................. 375/1 |
| 5,229,996 A | | 7/1993 | Bäckström et al. |
| 5,485,222 A | * | 1/1996 | Wischermann .............. 348/607 |
| 5,530,716 A | * | 6/1996 | Lipa ........................... 375/206 |
| 5,598,419 A | | 1/1997 | Weigand et al. |
| 5,644,591 A | | 7/1997 | Sutton |
| 5,790,589 A | * | 8/1998 | Hutchison, VI et al. .... 375/200 |
| 5,867,527 A | * | 2/1999 | Ziv et al. ..................... 375/208 |
| 5,907,813 A | * | 5/1999 | Johnson, Jr. et al. ....... 455/502 |
| 6,094,562 A | * | 7/2000 | Zhong ........................ 455/67.6 |
| 6,285,876 B1 | * | 9/2001 | Zhong ........................ 455/424 |

FOREIGN PATENT DOCUMENTS

WO    WO 96/04716    2/1996

OTHER PUBLICATIONS

J. Jorgensen, I. Kostanic, and W. Foose. Application of Channel Sounding to CDMA PCS Design at 1900 MHZ. 1997 IEEE. pp. 1937–1941.*

J. Yang, D. Bao, and M. Ali. PN Offset Planning in IS–95 Based CDMA Systems. 1997 IEEE. pp. 1435–1439.*

C. Baum and V. Veeravalli. Hybrid Acquisition Schemes for Direct Sequence CDMA Systems. 1994 IEEE. pp. 1433–1437.*

H. Arslan, L. Krasny, D. Koilpillai, and S. Chennakeshu. Doppler Spread Estimation for Wireless Mobile Radio Systems. 2000 IEEE. pp. 1075–1079.*

"Mobile Station Base Station Compatibility Standard for Dual–Mode Wideband Spread Spectrum Cellular System", TIA/EIA/IS–95–A, 1995.

* cited by examiner

Primary Examiner—Hassan Kizou
Assistant Examiner—Joe Logsdon
(74) Attorney, Agent, or Firm—Mendelsohn & Associates PC

(57) ABSTRACT

A receiver scans through two different search windows to detect a received signal: a first search window and a second search window. The timing of the second search window is adjusted after every processing cycle to follow the detected signal, while the timing of the first search window remains fixed. If the timing of the detected signal remains relatively constant for a sufficient period of time, then the timing of both the first search window and the second search window are adjusted based on the timing of the most recently detected signal. In this way, the receiver can continue to detect the received signal, even when the timing of the received signal varies greatly over time, without necessarily changing the first search window.

18 Claims, 5 Drawing Sheets

SEARCH SCHEME FOR RECEIVERS IN MOBILE COMMUNICATION SYSTEMS

BACKGROUND OF THE INVENTION

1. Field of the Invention

The present invention relates to communication systems, and, in particular, to mobile telephony systems that conform, for example, to the IS-95 standard.

2. Description of the Related Art

A typical mobile telephony system has a distribution of base stations located throughout the system's coverage area, with each base station supporting communications with those mobile units that are currently located within the coverage range of that base station. At the initiation of communications with a base station, each mobile unit derives a time reference from the arrival of either the forward-link pilot channel or the forward-link paging channel received from the base station (depending on whether the communications are initiated by the mobile unit or the base station). The base station derives its own time reference from global positioning system (GPS) signals received by a GPS receiver at the base station.

A mobile unit uses the derived time reference to control the timing of events within each processing cycle. For example, a mobile unit uses the derived time reference to determine when to transmit reverse-link communication signals back to the base station. The receiver at the base station uses its GPS time reference to define a search window in each signal period within which it scans for reverse-link signals transmitted by the mobile unit.

FIG. 1 shows a block diagram of a mobile unit 102 and a base station 104 of a mobile telephony system. One of the characteristics of a mobile telephony system is that signals transmitted from one node in the system (e.g., base station 104) may reach another node (e.g., mobile unit 102) by two or more different signal paths. For example, one signal path may be the "direct" line-of-sight path 108 between the two nodes, while other signal paths may be "indirect" paths, such as path 110, in which signals are received by the second node after reflecting off one or more different physical objects (e.g., a mountain, a building, or even the atmosphere), such as physical object 106. Because the different signal paths will typically have different lengths, different versions of the same signal will be received at the second node at slightly different times. This phenomenon is referred to as multi-path and the different received versions of a single signal are referred to as the multi-path components. In an IS-95 communication system, each mobile unit selects its time reference based on the earliest arriving multi-path component. See Section 6.1.5.1 of the IS-95A Specification.

Another characteristic of a mobile telephony system is that the relative signal strengths of the individual components of a multi-path signal can vary over time. More often than not this results from movement of the mobile units within a base station coverage area. For example, as the user of a mobile unit drives in a car, the direct line-of-sight path between the base station and the mobile unit may become temporarily blocked by other vehicles, buildings, or terrain. During such times, the multi-path component corresponding to the direct line-of-sight path may become significantly attenuated. In that case, the direct line-of-sight multi-path component may no longer be the earliest arriving multi-path component of sufficient signal strength, and the mobile unit may need to derive a new time reference based on a different "earliest arriving" multi-path component of the forward-link signal. Since this different multi-path component will follow a signal path from the base station to the mobile unit having a length longer than the direct line-of-sight signal path, the new derived time reference will be later than the previous derived time reference. Similarly, when the temporary obstruction ends, the direct line-of sight signal may once again become the earliest arriving multi-path component, and the mobile unit will again derive a new time reference, which in this case will be earlier than the immediately previous derived time reference, which was based on an indirect signal path.

Whenever the mobile unit changes its time reference, it will adjust the timing at which it transmits reverse-link signals to the base station. As such, the reverse-link signals will arrive at the receiver(s) of the base station at different times within the base station's processing cycle.

The size of the search window used by a base station receiver to search for reverse-link signals transmitted by a mobile unit is typically based on the expected variations in the time of arrival of the reverse-link signals due primarily to changes in the multi-path signals. These variations are caused both by changes in the forward-link multi-path signals (from which the mobile unit derives its time reference) as well as by changes in the reverse-link signals, which can also have their own varying multi-path components. The range of these variations in arrival time of the reverse-link signal at the base station is referred to as the delay spread.

Although the size of the base station search window is typically selected to handle normal variations in the time of arrival of the reverse-link signals, there are situations that can occur for which the base station search window is typically too small. For example, when a mobile unit starts to hand off from an old base station to a new base station, the mobile unit may begin to treat the signal from the new base station as a component of the multi-path signal. If the signal from the new base station arrives earlier than any of the signal components from the old base station, the mobile unit may change its derived time reference based on the earlier arriving signal from the new base station. If the arrival time of the signal from the new base station is sufficiently earlier than the earliest arriving component from the old base station, the time reference may change so much that the reverse-link signals will arrive at the old base station before the start of it search window. In that case, the communication link between the mobile unit and the old base station will be dropped. The same thing will happen to the new base station. The result will be the complete termination of communications with the mobile unit.

One way to limit this problem is to increase the size of the base station search window to handle even larger variations in arrival time of the reverse-link signals. This is an undesirable solution because it greatly increases the routine processing demands in the base station just to handle a problem that occurs only in certain limited circumstances.

SUMMARY OF THE INVENTION

The present invention is directed to a signal search scheme for mobile telephony systems that addresses the problem of dropped communications when changes in the time reference used by a mobile unit to transmit reverse-link signals to a base station cause the received signal to fall outside of the base station search window. According to the present invention, the receiver in the base station uses two search windows to scan for reverse-link signals transmitted by a mobile unit: (1) a first search window and (2) a second search window. The timing of the second search window (i.e., the start and stop times) follows the detected signal, while the timing of the first search window remains relatively constant. If the timing of the detected signal remains relatively constant for a sufficient length of time (e.g., a specific number of processing cycles), then the timing of the first search window is adjusted based on the timing of the most recently received signal.

The present invention allows the base station receiver to continue to detect reverse-link signals, even when the derived time reference used by the mobile unit changes greatly. According to the present invention, the second search window at the base station receiver will track the received signals even when they fall outside of the first search window. At the same time, the search scheme of the present invention is designed to avoid moving the first search window during relatively short periods of noise or interference.

According to one embodiment of the present invention, a first search window and a second search window are defined, and scanning is performed for the received signal within both search windows. The timing of the second search window is adjusted to follow the received signal from cycle to cycle, while maintaining the timing of the first search window. The timing of the first search window is adjusted only when a specified criterion is met, e.g., when the timing of the detected signal remains relatively constant for a specified number of processing cycles.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
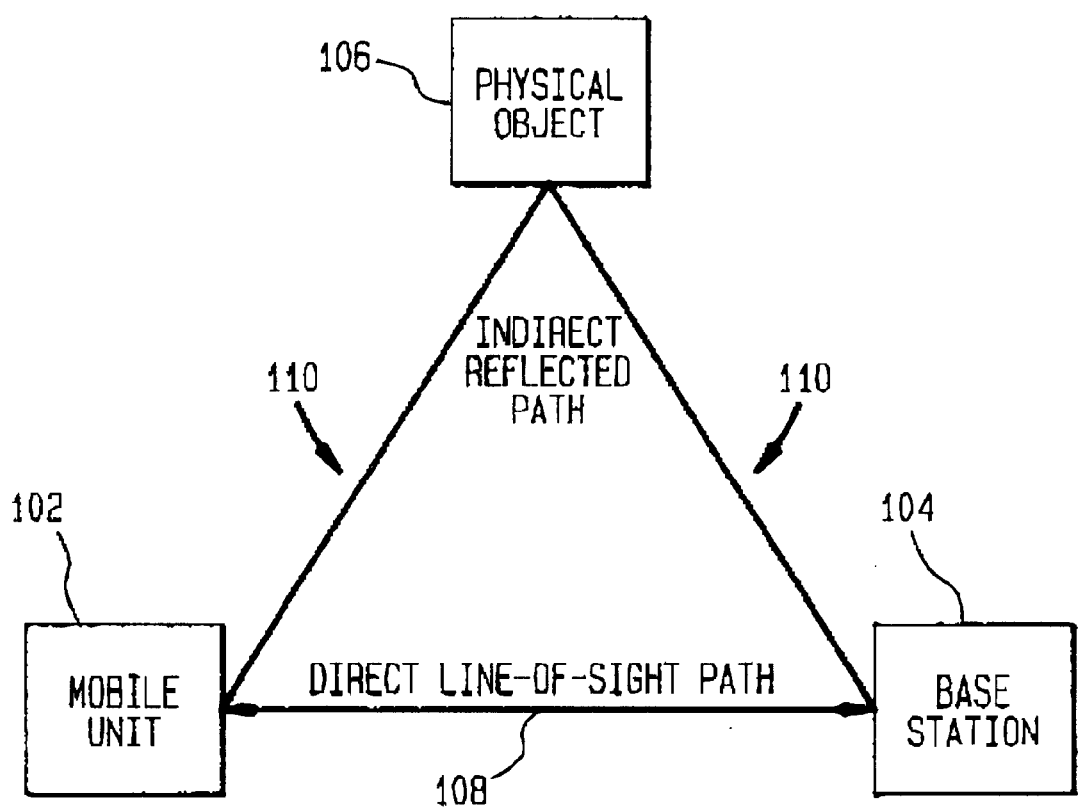
FIG. 1 shows a block diagram of a mobile unit and a base station of a mobile telephony system.
Figure 2:
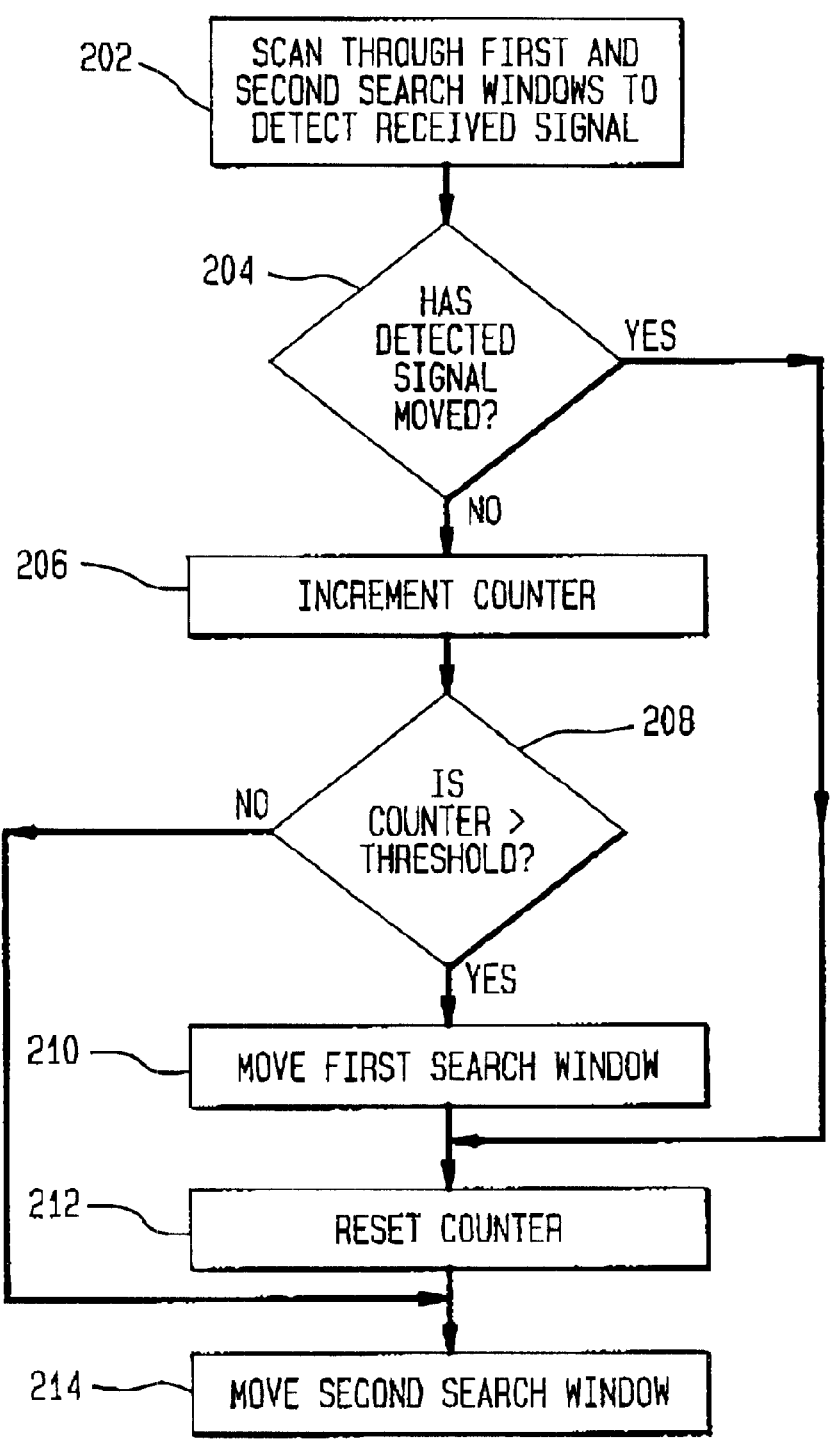
FIG. 2 shows a flow diagram of the processing implemented in the receiver of a base station, such as the base station of FIG. 1, according to one embodiment of the present invention.

FIG. 2 shows a flow diagram of the processing implemented in the receiver of a base station, such as base station 104 of FIG. 1, according to one embodiment of the present invention. In this embodiment, the present invention is implemented in the context of a mobile telephony system that conforms to the IS-95 standard, although the invention can also be applied to mobile telephony systems that conform to standards other than the IS-95 standard, as well as to types of communication systems other than mobile telephony systems. The present invention could also be implemented in the mobile units of a mobile telephony system.

The processing shown in FIG. 2 is implemented each processing cycle. According to the embodiment of FIG. 2, the base station uses two search windows to scan for reverse-link signals transmitted by a mobile unit: (1) a first search window and (2) a second search window. The size of the first search window is typically based on the expected size of the delay spread, while the size of the second search window is made as small as possible to save processor time, but not so small as to be unable to follow the detected signal from cycle to cycle. The size of the second search window may be based on empirical results from actual system testing, and will typically be smaller than the first search window.

In general, the second search window follows the detected signal from cycle to cycle, while the first search window remains relatively fixed. The timing of the second search window is adjusted based on the timing of the detected signal from the previous processing cycle. In this way, the received signal can continue to be detected even if the received signal falls outside of the first search window. If the timing of the detected signal remains relatively constant for a sufficient period of time (e.g., a specified number of processing cycles), then the timing of the first search window is adjusted based on the timing of the most recently detected signal. As long as the received signals are detected in at least one of the two search windows, communications between the mobile unit and the base station can be maintained.

In particular, during each processing cycle, the base station scans through both the first and second search windows to detect the received signal (step 202 of FIG. 2). If the timing of the detected signal has changed sufficiently since the previous processing cycle (step 204) (based, for example, on some specified threshold), then processing skips to step 212. Otherwise, processing proceeds to step 206, in which a counter is incremented. This counter keeps track of the number of consecutive processing cycles in which the timing of the detected signal has not changed sufficiently since the previous processing cycle.

If the counter exceeds a specified threshold (e.g., 12) (step 208), then the timing of the first search window is adjusted based on the timing of the most recently detected signal (step 210), and the counter is reset to zero (step 212). Otherwise, processing skips to step 214, in which the timing of the second search window is adjusted based on the timing of the most recently detected signal.

Figure 3:
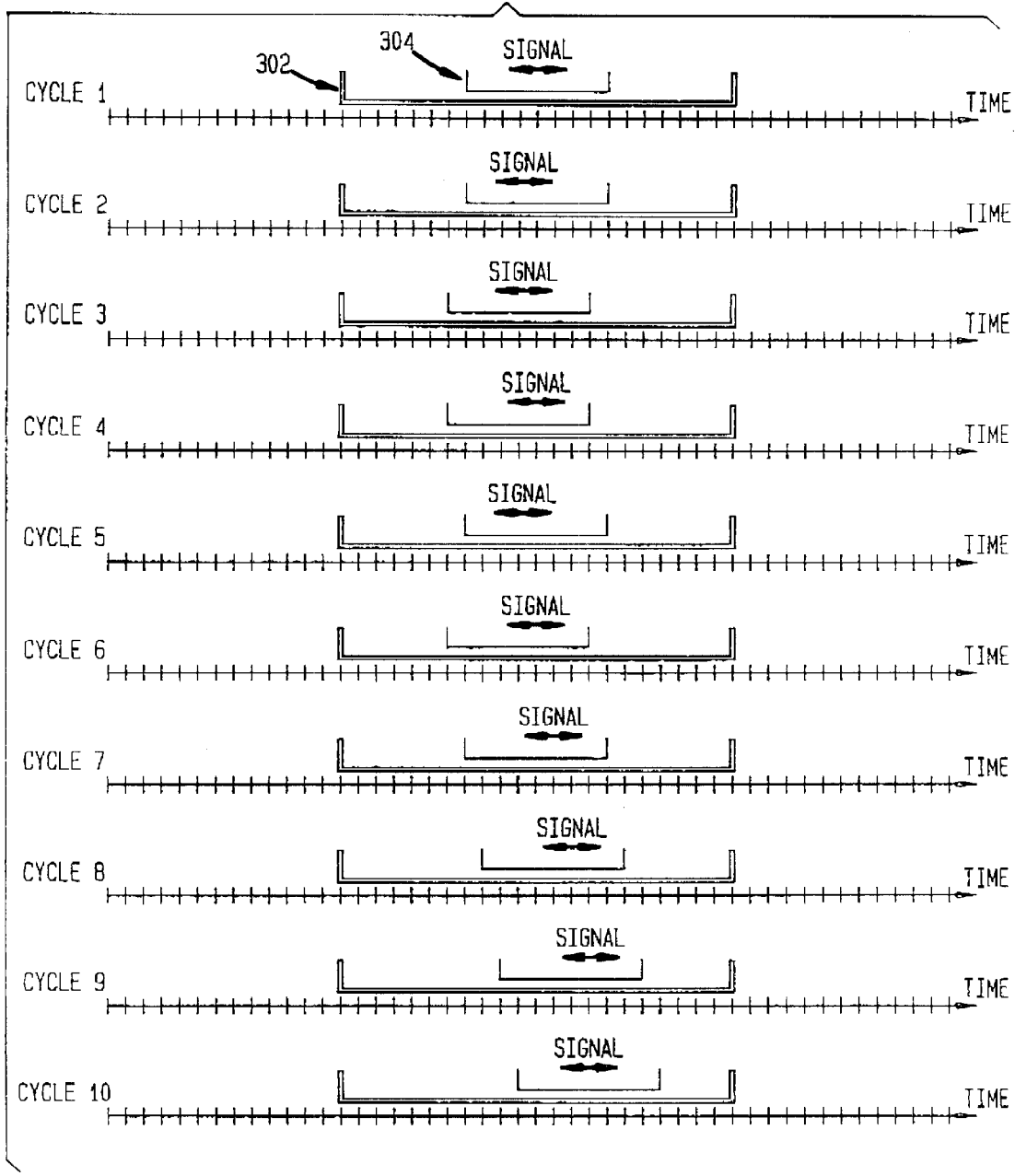
FIGS. 3–5 demonstrate the results of implementing the processing of FIG. 2 for three different scenarios.
Figure 4:
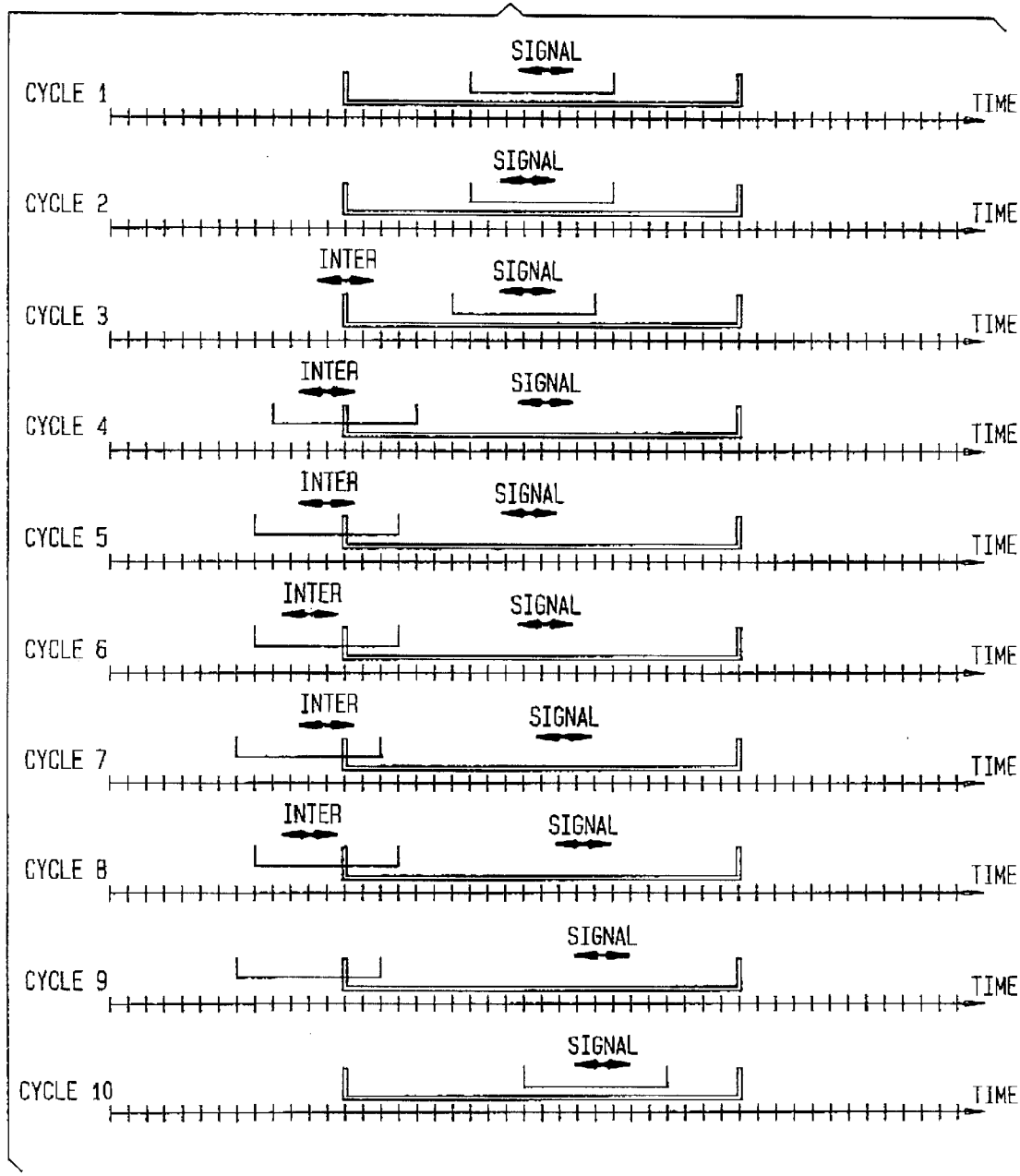
Figure 5:
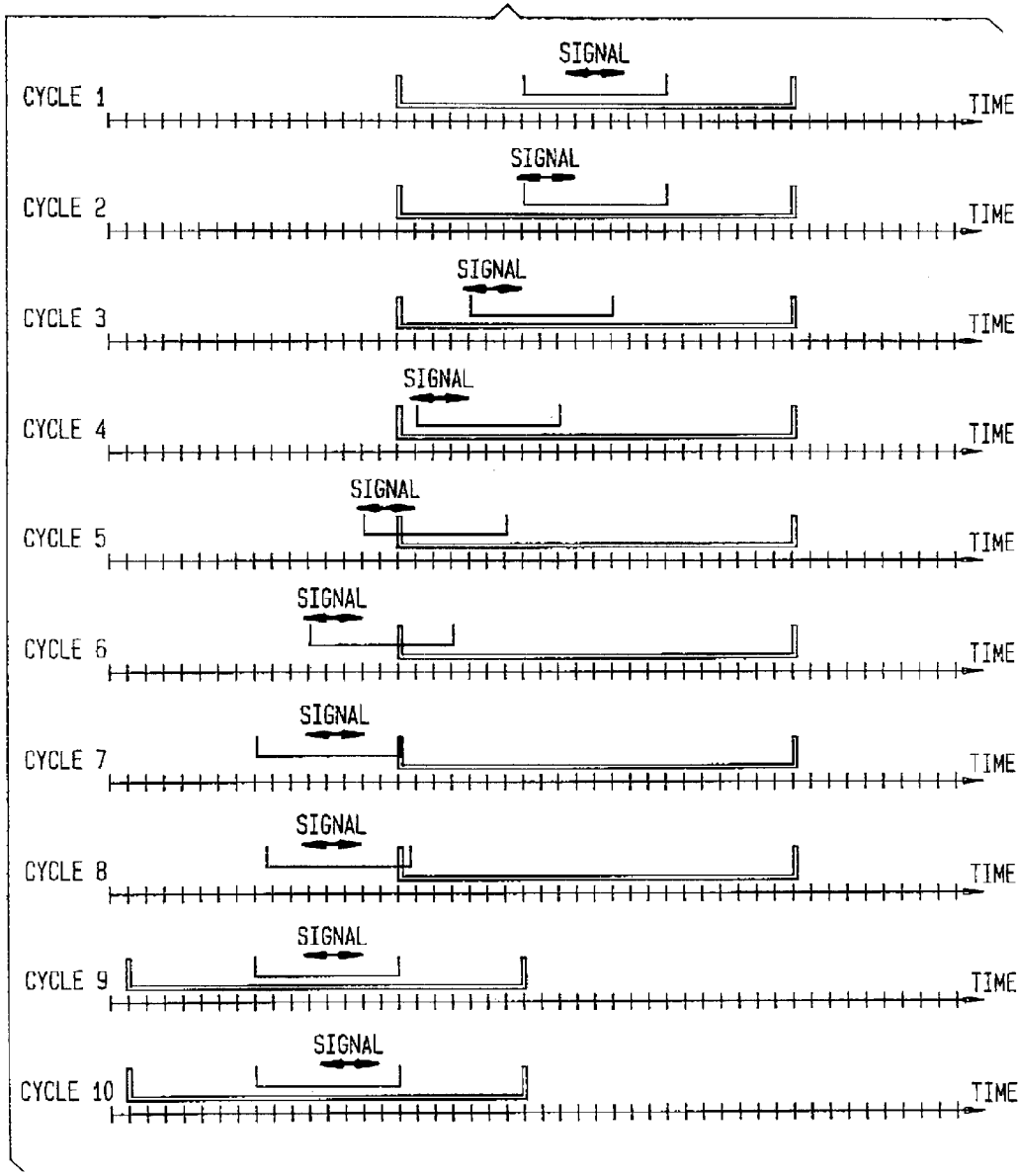

FIGS. 3–5 demonstrate the results of implementing the processing of FIG. 2 for three different scenarios. FIG. 3 corresponds to processing in the presence of normal relatively small variations in the timing of the detected signal. FIG. 4 corresponds to processing in the presence of a temporary interference signal. FIG. 5 corresponds to processing during a period in which the mobile unit is steadily changing between two different derived time references.

As shown in FIG. 3, as the timing of the detected signal varies, the timing of the small second search window is adjusted from cycle to cycle. For example, Cycle 1 corresponds to an ideal situation in which the second search window 302 is centered within the first search window 304 and the received signal is detected at the center of these two search windows. In Cycle 2, however, the received signal is detected off of the center of the search windows. This results in the timing of the second search window to be adjusted for Cycle 3. Every time the received signal is detected at a different timing position, the timing of the second search window is adjusted for the next processing cycle. In the sequence shown in FIG. 3, the timing of the detected signal is not sufficiently stationary for the timing of the first search window 304 to be changed.

In the sequence shown in FIG. 4, the timing of the true signal is identical to that in FIG. 3. In the sequence of FIG. 4, however, an interference signal is present during Cycles 3–8. If the base station begins to treat the interference signal as the earliest arriving reverse-link component, the timing of the second search window will be adjusted to follow the interference signal from cycle to cycle, as in Cycles 4–9. The timing of the first search window remains stationary, because the interference signal is neither stationary enough nor present long enough for the first search window to be moved. As such, the true signal continues to be detected within the first search window, even though the true signal falls outside of the second search window, and communications with the mobile unit are therefore maintained.

When the interference signal disappears after Cycle 8, the true signal will still be detected by the first search window in Cycle 9, and the timing of the second search window will be adjusted for Cycle 10 based on the detected true signal.

FIG. 5 corresponds to a situation in which the reverse-link signal transmitted by a mobile unit steadily changes from one derived reference time to another derived reference time (e.g., at the maximum rate of change as specified in the IS-95 specification). After the timing of the detected signal remains relatively constant for a specified number of processing cycles (e.g., 3 cycles in the example of FIG. 5 (Cycles 6–8), although any number can be used), the timing of the first search window is adjusted (in Cycle 9), based on the timing of the most recently detected signal.

In the sequence of FIG. 5, the second search window continues to follow the detected signal even when it falls outside of the first search window. If the second search window was not present, the communications between the mobile unit and the base station would be dropped.

The present invention provides a signal search scheme that enables communications to be maintained in a mobile telephony system, even during periods of significant change in the time reference used by a mobile unit to transmit its reverse-link signals to a base station, with minimal impact to processing load due to the additional small search window.

In the embodiment of FIG. 2, the first search window is moved after the detected signal remains relatively stationary for a specified number of processing cycles. In other embodiments of the present invention, different criteria may be used to determine when to move the first search window. For example, in an alternative embodiment, the first search window could be moved whenever the detected signal falls outside of the first search window for a sufficient number of processing cycles.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for detecting a received signal at a single receiver, comprising the steps of:
   (a) defining a first search window and a second search window;
   (b) scanning, at the single receiver, for the received signal in both the first and second search windows to detect the received signal, wherein scanning to detect the received signal is not performed outside of both the first and second search windows;
   (c) adjusting the timing of the second search window from processing cycle to processing cycle to follow the detected received signal;
   (d) determining whether the timing of the detected received signal remains relatively constant for a specified number of processing cycles; and
   (e) adjusting the timing of the first search window if it is determined that the timing of the detected received signal has remained relatively constant for the specified number of processing cycles.

2. The invention of claim 1, wherein the second search window is smaller than the first search window.

3. The invention of claim 1, wherein the size of the first search window is determined based on delay spread size for the received signal.

4. The invention of claim 1, wherein step (b) comprises the step of scanning for the received signal in both the first and second search windows in each processing cycle.

5. The invention of claim 1, wherein:
   step (c) comprises the step of adjusting start and end times for the second search window from processing cycle to processing cycle to follow the detected received signal; and
   step (e) comprises the step of adjusting start and end times for the first search window if it is determined that the timing of the detected received signal has remained relatively constant for the specified number of processing cycles.

6. An apparatus for detecting a received signal at a single receiver, comprising:
   (a) means for defining a first search window and a second search window;
   (b) means for scanning, at the single receiver, for the received signal in both the first and second search windows to detect the received signal, wherein scanning to detect the received signal is not performed outside of both the first and second search windows;
   (c) means for adjusting the timing of the second search window from processing cycle to processing cycle to follow the detected received signal;
   (d) means for determining whether the timing of the detected received signal remains relatively constant for a specified number of processing cycles; and
   (e) means for adjusting the timing of the first search window if it is determined that the timing of the detected received signal has remained relatively constant for the specified number of processing cycles.

7. The invention of claim 6, wherein the second search window is smaller than the first search window.

8. The invention of claim 6, wherein the size of the first search window is determined based on delay spread size for the received signal.

9. The invention of claim 6, wherein means (b) comprises means for scanning for the received signal in both the first and second search windows in each processing cycle.

10. The invention of claim 6, wherein:
    means (c) comprises means for adjusting start and end times for the second search window from processing cycle to processing cycle to follow the detected received signal; and
    means (e) comprises means for adjusting start and end times for the first search window if it is determined that the timing of the detected received signal has remained relatively constant for the specified number of processing cycles.

11. A receiver for detecting a received signal, wherein:
    the receiver is configured to define a first search window and a second search window;
    the receiver is configured to scan for the received signal in both the first and second search windows to detect the received signal, wherein scanning to detect the received signal is not performed outside of both the first and second search windows;

the receiver is configured to adjust the timing of the second search window from processing cycle to processing cycle to follow the detected received signal;

the receiver is configured to determine whether the timing of the detected received signal remains relatively constant for a specified number of processing cycles; and the receiver is configured to adjust the timing of the first search window if it is determined that the timing of the detected received signal has remained relatively constant for the specified number of processing cycles.

12. The invention of claim 11, wherein the second search window is smaller than the first search window.

13. The invention of claim 11, wherein the size of the first search window is determined based on delay spread size for the received signal.

14. The invention of claim 11, wherein the receiver is configured to scan for the received signal in both the first and second search windows in each processing cycle.

15. The invention of claim 11, wherein:

the receiver is configured to adjust start and end times for the second search window from processing cycle to processing cycle to follow the detected received signal; and the receiver is configured to adjust start and end times for the first search window if it is determined that the timing of the detected received signal has remained relatively constant for the specified number of processing cycles.

16. A method for detecting a received signal at a single receiver, comprising the steps of:

(a) defining a first search window and a second search window;

(b) scanning, at the single receiver, for the received signal in both the first and second search windows to detect the received signal;

(c) adjusting the timing of the second search window from processing cycle to processing cycle to follow the detected received signal;

(d) determining whether the timing of the detected received signal remains relatively constant for a specified number of processing cycles; and (e) adjusting the timing of the first search window, in a manner that depends on the timing of the detected received signal, if and only if it is determined that the timing of the detected received signal has remained relatively constant for the specified number of processing cycles, wherein the timing of the second search window follows the detected signal, while the timing of the first search window remains relatively constant.

17. An apparatus for detecting a received signal at a single receiver, comprising:

(a) means for defining a first search window and a second search window;

(b) means for scanning, at the single receiver, for the received signal in both the first and second search windows to detect the received signal;

(c) means for adjusting the timing of the second search window from processing cycle to processing cycle to follow the detected received signal;

(d) means for determining whether the timing of the detected received signal remains relatively constant for a specified number of processing cycles; and (e) means for adjusting the timing of the first search window, in a manner that depends on the timing of the detected received signal, if and only if it is determined that the timing of the detected received signal has remained relatively constant for the specified number of processing cycles, wherein the timing of the second search window follows the detected signal, while the timing of the first search window remains relatively constant.

18. A receiver for detecting a received signal, wherein:

the receiver is configured to define a first search window and a second search window;

the receiver is configured to scan for the received signal in both the first and second search windows to detect the received signal;

the receiver is configured to adjust the timing of the second search window from processing cycle to processing cycle to follow the detected received signal;

the receiver is configured to determine whether the timing of the detected received signal remains relatively constant for a specified number of processing cycles; and the receiver is configured to adjust the timing of the first search window, in a manner that depends on the timing of the detected received signal, if and only if it is determined that the timing of the detected received signal has remained relatively constant for the specified number of processing cycles, wherein the timing of the second search window follows the detected signal, while the timing of the first search window remains relatively constant.

* * * * *